M. GOLDSMITH.
WHEEL STRUCTURE.
APPLICATION FILED FEB. 23, 1911.

1,001,753.

Patented Aug. 29, 1911.

2 SHEETS—SHEET 1.

Witnesses
J. Milton Jester

Inventor
Manning Goldsmith

By C. L. Parker
Attorney

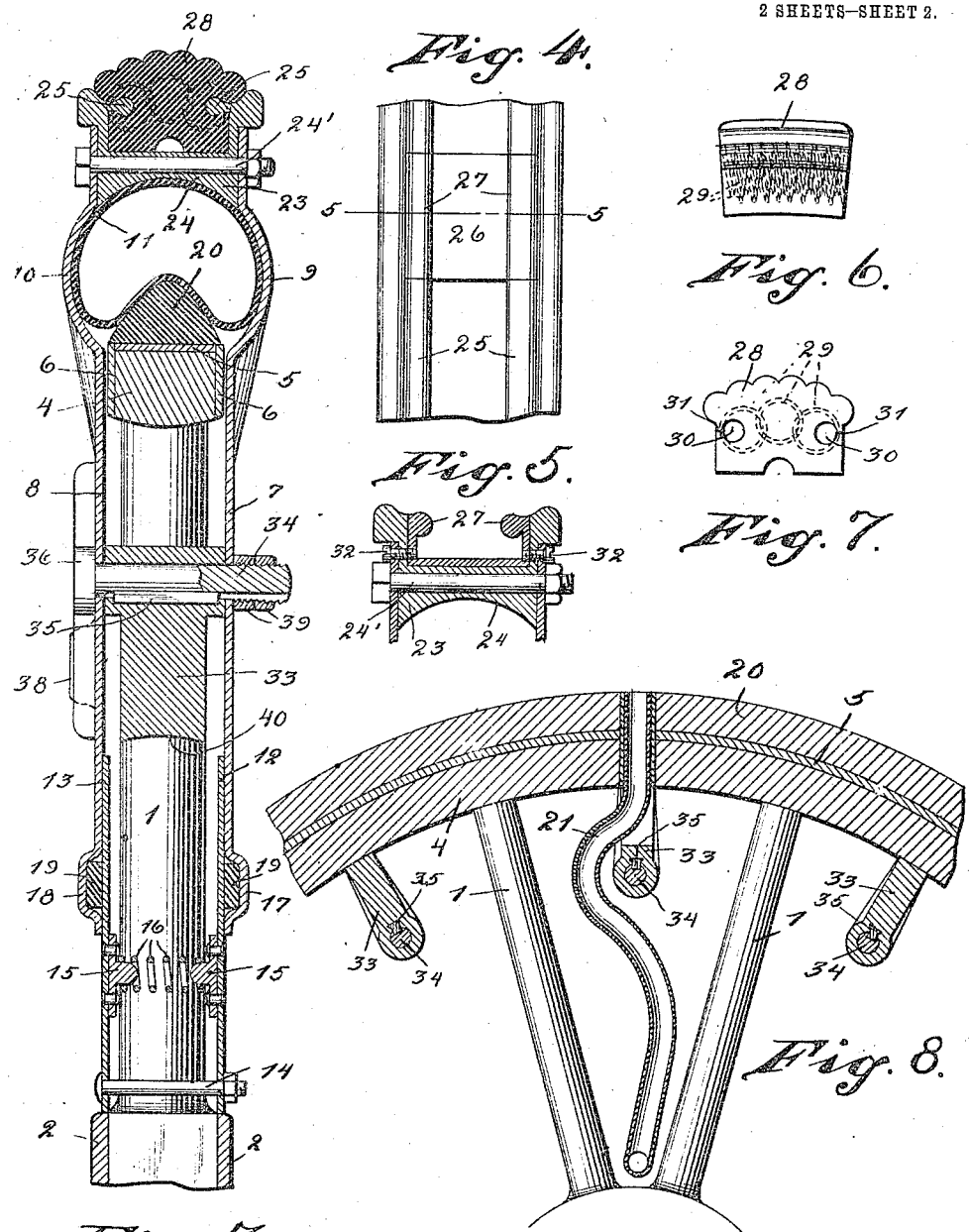

UNITED STATES PATENT OFFICE.

MANNING GOLDSMITH, OF DECATUR, GEORGIA.

WHEEL STRUCTURE.

1,001,753.

Specification of Letters Patent. Patented Aug. 29, 1911.

Application filed February 23, 1911. Serial No. 610,176.

*To all whom it may concern:*

Be it known that I, MANNING GOLDSMITH, a citizen of the United States, residing at Decatur, in the county of Dekalb and State of Georgia, have invented certain new and useful Improvements in Wheel Structures, of which the following is a specification.

My invention relates to a wheel structure, to be used in connection with automobiles or other vehicles, such wheel structure being capable of fulfilling the functions of the ordinary pneumatic tired wheel and at the same time being free from certain disadvantages encountered in connection with the employment of pneumatic tires.

An important object of this invention is to provide a wheel structure which is highly elastic and not liable to disarrangements.

A further object of this invention is to provide a wheel structure, including a pneumatic tire, and means whereby such wheel structure may be successfully operated in case such pneumatic tire should become punctured or the like.

Other objects and advantages of this invention will be apparent during the course of the following description.

Figure 1:
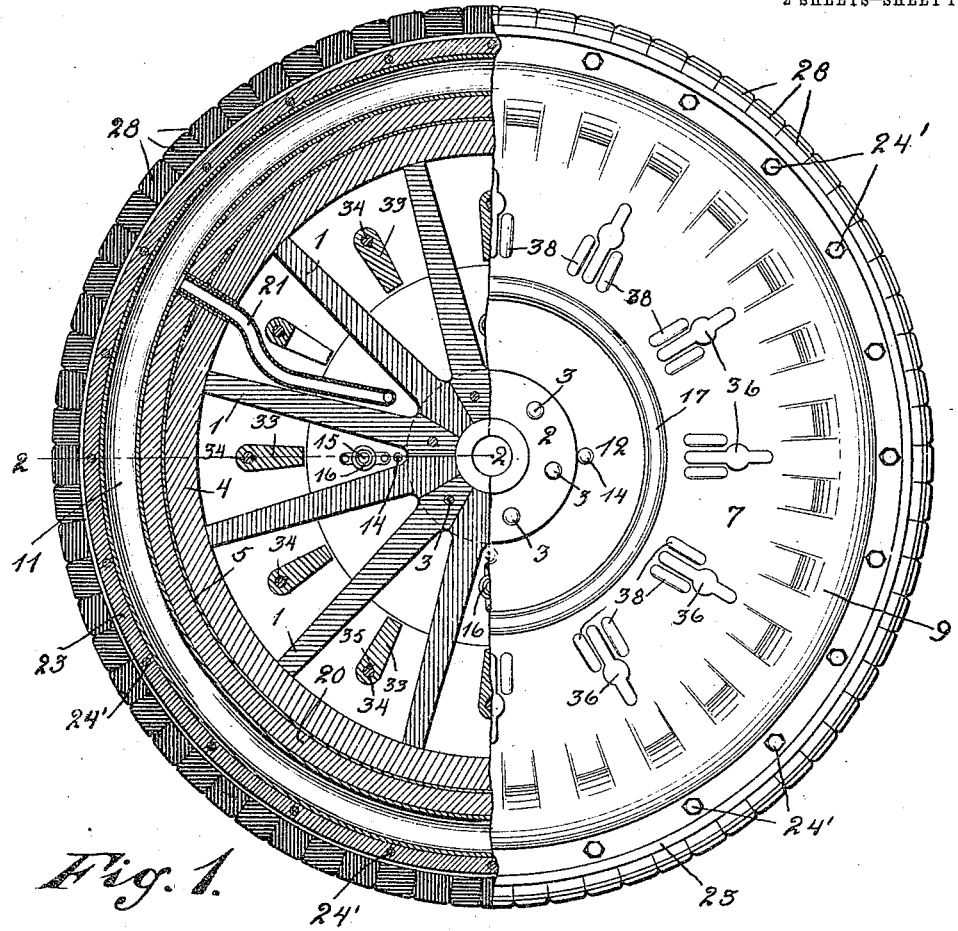
Figure 2:
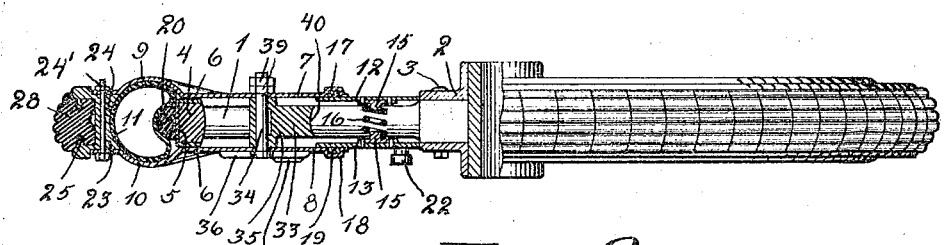

In the accompanying drawings forming a part of this specification and in which like numerals are employed to designate like parts throughout the same, Figure 1 is a side view of my wheel structure, parts thereof being shown in section, Fig. 2 is a plan view of the same, parts being shown in horizontal section, taken on line 2—2 of Fig. 1, Fig. 3 is an enlarged sectional view, taken on the line 2—2 of Fig. 1, Fig. 4 is a fragmentary plan view of a metal ring included in the wheel structure, Fig. 5 is a cross-sectional view taken on line 5—5 of Fig. 4, Fig. 6 is a side view of one of the elastic blocks included in the wheel structure, Fig. 7 is an end view of the same, and, Fig. 8 is an enlarged fragmentary portion of the inner wheel, included in the wheel structure.

In the drawings wherein is illustrated a preferred embodiment of my invention, the numeral 1 designates spokes of an inner wheel, which meet at their inner ends for connection with castings 2, as shown at 3, for forming a hub. The outer ends of the spokes 1 are connected with a felly 4, which preferably carries upon its periphery a metal band 5, and upon its opposite end annular strips of metal 6, which are secured thereto by any suitable means. Upon opposite sides of the spokes 1 are disposed annular sheet metal casings 7 and 8, pressed into the desired shape, as shown. These annular casings are bent outwardly near their peripheries, as shown at 9 and 10, respectively, to afford an annular space, for the reception of a pneumatic tire 11.

Disposed upon opposite sides of the spokes 1 and adjacent the hub, are annular plates 12 and 13, which are connected by bolts 14. The plates 12 and 13 have slidable engagement with the inner surface of the casings 7 and 8, respectively. The plates 12 and 13 are provided at suitable points, preferably 90° apart, with pairs of lugs 15, having suitable connection with the same. Disposed between each pair of lugs 15 is a compressible coil spring 16, the function of which is to yieldingly hold the plates 12 and 13 in engagement with the casings 7 and 8, whereby a tight union is effected and the dust or the like prevented from entering the wheel structure. The casings 7 and 8 are provided near their inner peripheries with bent portions 17 and 18, respectively, which form annular sockets for the reception of packing 19, which may be felt or any other suitable material.

Disposed upon and suitably connected with the metallic band 5 is a solid elastic or rubber tire 20, which engages the pneumatic tire 11, as shown. In order that the pneumatic tire 11 may be inflated a flexible hose or tube 21 is provided, which extends between two of the spokes 1 and has its inner end suitably connected with a valve 22. This valve is mounted upon the plate 13 (see Fig. 2). There may be any suitable number of these tubes 21. The tube 21 is made sufficiently long so that the same will normally be coiled, whereby it does not interfere with the relative radial movement of the outer casing including the casings 7 and 8 and the inner wheel.

Disposed upon the pneumatic tire 11 is a metal ring 23, which is substantially U-shaped in cross-section. The inner side of this ring is rounded out, as shown at 24, to conform to the curvature of the tire 11. The ring 23 is disposed between the casings 7 and 8 and rigidly connected therewith by bolts 24. The casings 7 and 8 together with the ring 23 form an outer casing for inclosing the inner wheel. The ring 23 is provided with inwardly extending annular flanges or beads 25. As shown in Fig. 4, these beads are cut away to form a space for the reception of a removable socket 26, which is provided with beads 27 forming in effect, a portion of the beads 25. By removing the socket 26 the ring 23 may be filled with a plurality of elastic blocks 28, shown in Figs. 6 and 7. Each of the blocks 28 has embedded therein three or more coil springs 29. The turns of one spring being attached to the turns of the other spring, as shown. The function of these springs is to reinforce the blocks and to prolong their life without materially affecting their elasticity. Each of the blocks 28 is provided near its sides with longitudinal openings 30 formed therethrough. The sides of the block 28 are slit, as shown at 31. From the description of the above referred to parts, it is obvious that the blocks 28 are held within the ring 23 by the beads 25 fitting within the openings 30, as clearly shown in Fig. 3. After the ring 23 has almost been filled with the blocks 28, the last block 28 is inserted within the socket 26, the beads 27 fitting within the openings 30. This socket is then secured in place by screws 32.

Disposed between the spokes 1 and near the felly 4 are spacing members 33, adapted to hold the casings 7 and 8 in their proper spaced relation. Each of the spacing members 33 is pivotally connected with casings 7 and 8 by a bolt 34, which is disposed within suitable openings formed through said casings. The spacing member 33 is splined upon the bolt 34 by means of a key 35, as shown in Fig. 3. One end of the bolt 34 carries a head 36, having a portion thereof disposed between ridges 38, whereby the rotation of the bolt is prevented. The opposite end of the bolt is screw-threaded to receive nuts 39. The free end of the spacing member 33 is curved, as shown at 40, to snugly engage the inner periphery of the felly 4, when such spacing member is swung outwardly and locked in its new position.

In the use of my wheel structure, when a load is placed in the same, such load will be transmitted to the inflated tire 11 and the elastic blocks 28, whereby all jars are taken up. The wheel structure is very elastic since the inner wheel is capable of moving radially with relation to the outer casing. Should the pneumatic tire 11 become punctured or the like, by swinging the spacing members 33 outwardly until they engage the felly 4, the inner wheel may be locked in a concentric position with relation to the outer casing, whereby the wheel structure may be successfully operated without the aid of the tire 11. When the tire 11 is inflated, the inner wheel is prevented by friction, from slipping in the outer casing. When the spacing members 33 engage the felly 4, they prevent the slipping of the inner wheel in the outer casing.

I wish it understood that the form of my invention herewith shown and described is to be taken as a preferred example of the same, and that certain changes in the shape, size and arrangement of parts may be resorted to without departing from the spirit of my invention or the scope of the subjoined claims.

Having thus described my invention, I claim:—

1. In a wheel structure, an inner wheel, an outer casing surrounding the inner wheel, a pneumatic tire disposed between the inner wheel and outer casing, and a plurality of members disposed entirely within and pivotally connected with the sides of said outer casing, to hold said sides in their proper spaced relation and to be adapted for swinging movement into and out of engagement with the periphery of the inner wheel, to rigidly lock said inner wheel and outer casing and release the same, respectively.

2. In a wheel structure, an inner wheel, an outer casing surrounding the inner wheel, a pneumatic tire disposed between said inner wheel and outer casing, a plurality of bolts movably mounted within openings formed through the sides of the outer casing, a corresponding number of members splined upon said bolts and disposed within the outer casing, means to turn said bolts to bring said members into and out of engagement with the periphery of the inner wheel, and means to lock the last named means in adjustment at different positions.

3. In a wheel structure, an inner wheel, an outer casing surrounding the inner wheel and comprising spaced substantially annular side walls, a pneumatic tire disposed between the inner wheel and outer casing, a plurality of members disposed within and pivotally connected with the side walls of said outer casing, means to swing said members into and out of engagement with the periphery of the inner wheel, and plates disposed upon opposite sides of and rigidly connected with the hub of the inner wheel to slidably engage said side walls.

In testimony whereof I affix my signature in presence of two witnesses.

MANNING GOLDSMITH.

Witnesses:
ROBERT C. W. RAMSPECK,
A. M. WIER.